United States Patent [19]

Reitberger

[11] Patent Number: 5,987,305

[45] Date of Patent: Nov. 16, 1999

[54] SYSTEM AND METHOD FOR AUTOMATICALLY SETTING UP A RADIO LINK FOR TRANSMITTING DATA BETWEEN TWO OR MORE TRANSMITTER/RECEIVER STATIONS

[75] Inventor: Peter Reitberger, München, Germany

[73] Assignee: Siemens Aktiengesellschaft, Munich, Germany

[21] Appl. No.: 09/093,536

[22] Filed: Jun. 8, 1998

Related U.S. Application Data

[63] Continuation of application No. PCT/DE96/02344, Dec. 6, 1996.

[30] Foreign Application Priority Data

Dec. 8, 1995 [DE] Germany .......................... 195 45 893

[51] Int. Cl.[6] .................................................. H04B 7/26
[52] U.S. Cl. ...................... 455/62; 455/67.1; 455/186.1; 455/516
[58] Field of Search ............................... 455/62, 67.1, 73, 455/185.1, 186.1, 454, 455, 464, 552, 553, 556, 557, 500, 515, 513, 516, 161.1, 161.2, 161.3, 180.1

[56] References Cited

U.S. PATENT DOCUMENTS

| | | | |
|---|---|---|---|
| 4,679,225 | 7/1987 | Higashiyama | 455/464 |
| 4,744,101 | 5/1988 | Saegusa | 455/464 |
| 4,894,856 | 1/1990 | Nakanishi et al. | 455/464 |
| 4,965,849 | 10/1990 | Kunihiro | 455/464 |
| 5,012,469 | 4/1991 | Sardana . | |
| 5,210,785 | 5/1993 | Sato et al. | 455/552 |
| 5,260,988 | 11/1993 | Schellinger et al. | 455/464 |

FOREIGN PATENT DOCUMENTS

| | | |
|---|---|---|
| 40 26 426 A1 | 2/1992 | Germany . |
| 2 287 381 | 9/1995 | United Kingdom . |

OTHER PUBLICATIONS

International Publication No. 93/22845 (Jones), dated Nov. 11, 1993.

International Publication No. 95/23485 (Longginou), dated Aug. 31, 1995.

"Third generation PCN and the intelligent multimode mobile portable", 8054 Electronics & Communication Journal, vol. 5, No. 3, Jun. 1993, pp. 147–156.

*Primary Examiner*—Reinhard J. Eisenzopf
*Assistant Examiner*—Lester G. Kincaid
*Attorney, Agent, or Firm*—Herbert L. Lerner; Laurence A. Greenberg

[57] ABSTRACT

A system and a method for automatic establishment of a radio link for data transmission between two or more transmitter-receiver stations stores data of the frequency bands and access procedures authorized for each of the bands in a memory unit. A search receiver searches all available frequency bands. The frequency band and the access procedure are determined in an evaluation device. The address of the opposite or remote station is transmitted through the evaluation device. When the search receiver of the opposite or remote station receives its address, it switches its data receiver to "receive" in the frequency band using the appropriate access procedure, and data is subsequently transmitted between the calling station and the opposite or remote station.

8 Claims, 1 Drawing Sheet

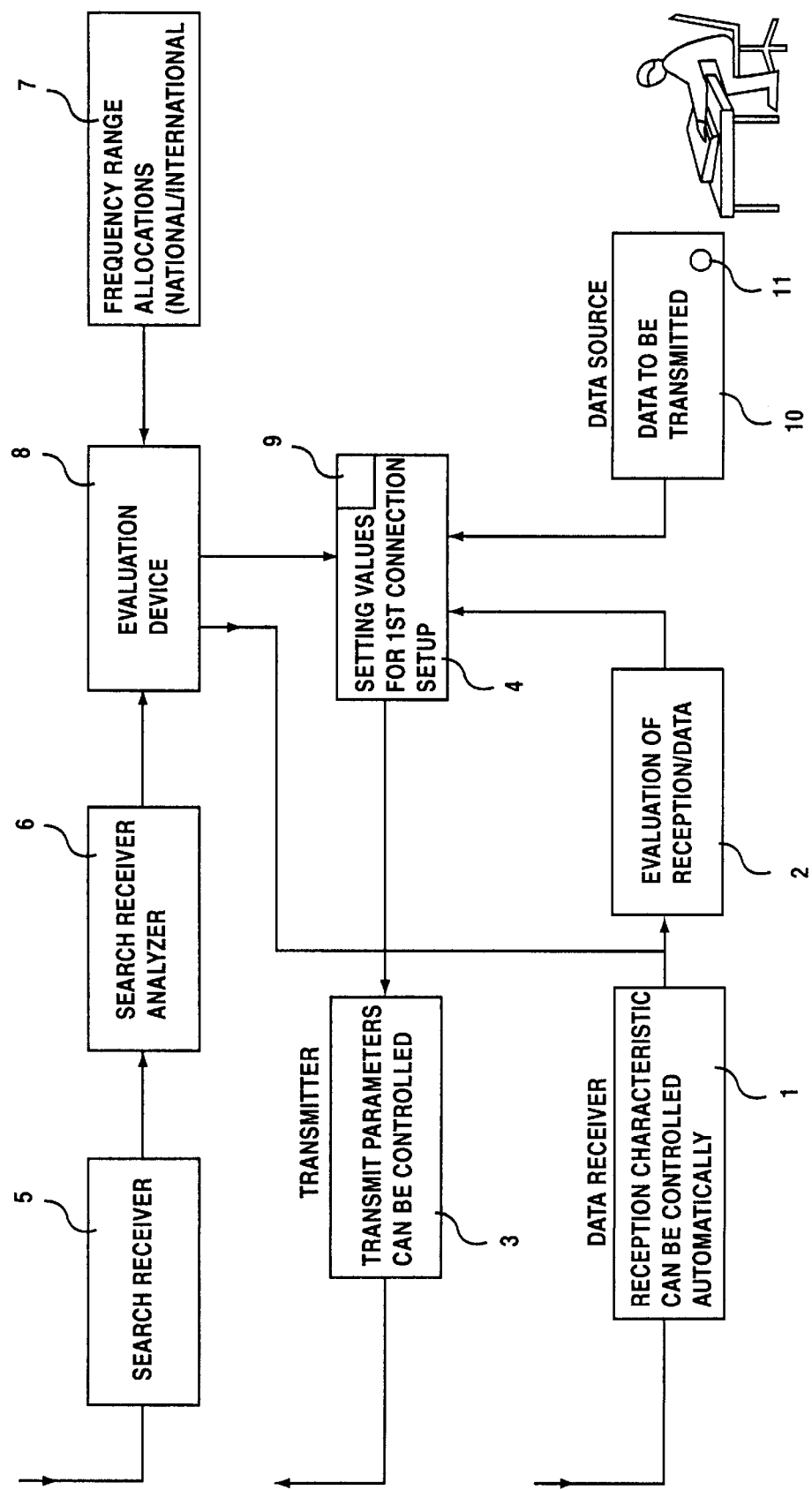

SYSTEM AND METHOD FOR AUTOMATICALLY SETTING UP A RADIO LINK FOR TRANSMITTING DATA BETWEEN TWO OR MORE TRANSMITTER/RECEIVER STATIONS

CROSS-REFERENCE TO RELATED APPLICATION

This application is a continuation of International Application No. PCT/DE96/02344, filed Dec. 6, 1996, which designated the United States.

BACKGROUND OF THE INVENTION

Field of the Invention

The invention relates to a system and a method for automatically setting up a radio link for transmitting data between two or more transmitter/receiver stations.

In the currently highly advanced state of radio transmission technology a user is provided with radio links for data transmission on a wide variety of frequency bands with a wide variety of access methods, depending on the country and technical development.

Thus, for example in the Federal Republic of Germany, the Federal Office for Post and Telecommunications assigns frequency range usage in the overall frequency range between 90 kHz and 275 GHz on various frequency-limited bands for state and private operators, with different radio access methods in each case, for example using the FDMA (Frequency Division Multiple Access) method in the frequency band between 87 MHz and 100 MHz, using the TDMA (Time Division Multiple Access) method in the frequency band between 890 and 960 MHz, and using the CDMA (Code Division Multiple Access) method in the frequency band between 1.9 and 2.2 GHz. Those respective multiple access methods are described, for example, in the book by Meinke and Gundlach, entitled: Taschenbuch der Hochfrequenztechnik [Pocket Guide to High-frequency Technology], 5th edition, pp. 050 to 065.

There are now also proposals to provide two or more different access methods in one frequency band, according to page 063 of the Meinke and Gundlach book.

In other countries, other frequency bands are correspondingly provided with different access methods.

A user who wishes to set up a radio link for data transmission using one of those methods, such as is, for example, requested now for the wireless interlinking of computers, is usually out of his or her depth as a non-specialist.

SUMMARY OF THE INVENTION

It is accordingly an object of the invention to provide a system and a method for automatically setting up a radio link for transmitting data between two or more transmitter/receiver stations, which overcome the hereinafore-mentioned disadvantages of the heretofore-known systems and methods of this general type and with which such a radio link can be set up on the respectively most favorable frequency band with the respectively most favorable access method for data transmission.

With the foregoing and other objects in view there is provided, in accordance with the invention, a system and a method for automatically setting up a radio link for transmitting data between two or more transmitter/receiver stations, comprising a memory of each station for storing data of frequency bands and of access methods to be respectively applied in the bands and provided for radio links in a respective zone of the stations requesting the radio link; a search receiver of each station searching all of the provided frequency bands continuously or at predetermined time intervals for a certain time, and analyzing and evaluating an instantaneous frequency allocation of the frequency bands provided by other transmitters; an evaluation device taking the stored frequency band data into account for determining which of the searched frequency bands with which access method permitted therein is most suitable for a radio link set up; a transmitter of a call station requesting the link then activated in the selected frequency band by the evaluation device, and broadcasting an address of an opposite or remote station; and upon the search receiver of the opposite or remote station receiving the call station transmitter transmitting its address, the opposite or remote station switching a data receiver thereof to reception in the frequency band with the access method permitted therein, for then carrying out a transmission of data between the call station and the opposite or remote station.

In the system according to the invention, the user himself or herself does not need any knowledge regarding the respectively provided frequency bands and access methods for setting up a radio link, since this is performed automatically for him or her by the system according to the invention. The user merely needs to inform the system as to the opposite station, of the same kind as his or her station, with which he or she wishes to make a radio link for transmitting data. The system then automatically picks out from the respective zone in which the call station of the user and the opposite station are located, the frequency band which is instantaneously the most favorable in that case, i.e. is assigned to the smallest degree to other transmitters. For example, it determines which access methods are permitted in this frequency band and then automatically sets up the requested radio link therein.

If the system determines that all of the frequency bands provided in the respective zone are over-assigned, and for that reason are at least instantaneously not available for a link setup, it automatically selects, from the various access methods available, in each case the one which also permits a radio link in an assigned frequency band in addition to the access methods already operated therein.

Not only are the data of the frequency bands and of the access methods respectively permitted in these bands stored in the memory of each station, but preferably preliminary information on the frequency range restrictions in the various countries, preferably throughout the world, are stored in addition. The respective legal restrictions can be complied with and the options in terms of frequency bands and access methods which are available for a link setup can be selected by the user entering the location at which the radio link is to be set up. The search receiver can then be activated according to these options. The fewer the legal restrictions in a zone, the more varied the possible selection by the search receiver.

In accordance with another feature of the invention, in order to provide a first analysis, it is generally sufficient for the search receiver to determine only the respective amplitude distribution in the frequency band to be searched. In this way it can determine very easily and quickly whether, and to what extent, a frequency band is assigned. If the stored data also indicate to the system which access method is permitted in a frequency band to be searched, through such an amplitude evaluation it is just possible to determine, with a high degree of probability, that the frequency band assignment which has been determined has been made by transmitters which operate according to this permitted access method. If, for example, it is specified that in a specific frequency band in Germany only an FDMA access method is permitted, it is possible to easily determine that a known assignment in this frequency band is also actually an FDMA assignment.

In accordance with a further feature of the invention, there is provided a simple additional analyzer in the search receiver, with which it is also possible to detect the respective access method in a direct automatic manner. This is because an analysis of the amplitude distribution in the respectively searched frequency band makes it possible to distinguish easily between TDMA, FDMA and CDMA, for example. Such an analysis becomes particularly simple if special standardized methods, that is to say, for example, GSM (Global System for Mobile Communication) mobile radio system, DECT (Digital European Cordless Telecommunication), FDMA with 50 kHz channel spacing or CDMA with 5 MHz chip rate, are expected in the various frequency bands on the basis of the frequency range assignments. In this case, the analyzer is programmed to detect such known standardized access methods, so that it can also distinguish automatically between a plurality of access methods provided in the searched frequency band.

In order to provide a link setup, it is not absolutely necessary for the access method to also be analyzed and detected if free frequency bands are found with the search receiver. This is necessary only in the case of assigned frequency bands.

If a suitable frequency band with an access method which is suitable and permitted in this frequency band is selected in this way in the call station using the system according to the invention, the transmitter of the call station is automatically set to this frequency band and to this selected access method, and the transmitter of the call station then transmits the address of the requested opposite station with which a link setup is requested. There is a very wide variety of known possibilities for the call detection of the opposite station. One possibility is that the call station broadcasts the address of the opposite station on a specific channel of the selected frequency band, which channel is reserved for the respective address of the opposite station.

Thus, a link setup could be organized, for example in a frequency band suitable for FDMA, in such a way that a specific channel is assigned to each station address. Thus, for example the opposite station could have the address 2340 and the channel with the address 2340 is assigned the frequency 283.5 mHz in the selected frequency band of, for example, 225–400 mHz with a 25 kHz FDMA channel spacing. In this case, the call station thus transmits at the frequency 283.5 mHz, and the opposite station in turn observes only this channel assigned in this case in this frequency band. Since the opposite station not only has to monitor this frequency band selected by the call station but also other frequency bands which are still available, the call signal of the call station is preferably transmitted in the form of a so-called interleaving code, so that the call signal can reliably be received and evaluated by the opposite station. During this first call procedure, only the call address and the respective channel recommendation, for example, are transmitted to the opposite station.

Another possibility is to provide a specific organization channel for a specific frequency band and an access method provided therefor, on which organization channel the call station broadcasts its call and which is respectively monitored by the opposite station during the search procedure. Other call detection organization systems, such as are now known in mobile telephony or public trunked mobile telephony and other transmission systems, can also be used for the first link setup with the system according to the invention.

Of course, the call station transmits its call in a frequency band in which a plurality of different access methods are possible, likewise with the access method which is preferred in the respective frequency band and is correspondingly defined in the respective call station memory.

When the link setup to the opposite station has been established, if appropriate it is possible to go over to another frequency band and another access method in a mutual dialogue between the call station and the opposite station if, for example, the opposite station determines that it is possible to set up a better radio link for it on another frequency band. In addition, it is also possible to optimize the respective parameters of the selected access method in a mutual dialogue.

In accordance with a concomitant feature of the invention, the broadcasting of the address of the opposite station is carried out by the call station in the selected frequency band in accordance with the access method preferred therein, and the search receiver of the opposite station searches in the frequency bands, in each case with the access methods preferred therein.

The system according to the invention is suitable particularly for the wireless interlinking of computers, since it is sufficient in this case to install in each computer a simple additional circuit board on which the individual components, such as search receiver, transmitter, data receiver, memory, evaluation device, etc. are provided. Modern component technology makes this possible in a very space-saving manner with very little expenditure. All that is then necessary is, for example, to provide a corresponding transmitter/receiver antenna on the outside of the computer. Instead of an additional antenna and a radio link over the free space, the power supply system could also be used as a transmission line system for interlinking computers, so that the need for a separate antenna is obviated and the transmitter feeds directly into the power system in each case. A low transmitter power of only a few Watts is sufficient for interlinking computers in this way.

Other features which are considered as characteristic for the invention are set forth in the appended claims.

Although the invention is illustrated and described herein as embodied in a system and a method for automatically setting up a radio link for transmitting data between two or more transmitter/ receiver stations, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a block circuit diagram of an automatic radio configuration system according to the invention.

DESCRIPTION OF THE PREFERRED EMBODIMENTS

Referring now in detail to the single FIGURE of the drawing, there is seen a block circuit diagram of a transmitter/receiver station which can be operated either as a call station or as an opposite or remote station. It is composed of a customary data receiver 1, which can be set, preferably digitally by using corresponding frequency synthesizers, to any desired location in a broad overall frequency range of, for example, several kHz to several 100 GHz. An output of this data receiver 1 is connected to a customary data evaluation device 2. The data receiver 1 can also be adjusted to any desired known access methods in terms of its reception frequency and its demodulator.

In addition, a transmitter 3 of several Watts output power is provided. The transmitter can likewise be adjusted, again preferably digitally through the use of synthesizers, to any desired transmit frequencies, likewise in an overall frequency range of any desired breadth. A common synthesizer, for example, could be provided for the receiver 1 and the transmitter 3. This transmitter 3 can also be set, by using a setting device 4, to any desired access methods for transmitting data.

In addition, a simple search receiver 5 is provided which searches the overall frequency range prescribed by the transmitter and receiver continuously or at predetermined time intervals, and analyzes the respective instantaneous frequency assignment of the frequency bands provided in the overall frequency range. The output of the search receiver is connected to an analyzer 6 in which the access method used in the respective frequency bands can be analyzed, if appropriate.

In addition, a memory 7 is provided, which respectively stores the data of the frequency bands and of the access methods that can be respectively applied in these frequency bands and which are provided in the respective zone in which the station for a radio link is to be operated. In addition, this memory 7 also has data stored in it that indicate which frequency bands are respectively released for radio links in the respective countries worldwide.

The memory 7 and the search receiver 5 are connected to an evaluation device 8 in which it is determined which of the frequency bands searched by the search receiver 5 is most suitable for a link setup at that moment, taking into account the data that are stored in the memory 7 and which relate to the frequency bands that have been released in the respective country (zone in which a link setup is requested). Generally, an evaluation of the amplitude distribution in the respective frequency bands is sufficient therefor. It is only if it is determined during the search procedure that all of the available frequency bands are assigned, that it is also necessary to take information of the analyzer 6 which relates to the access methods being used, into account during the evaluation. The evaluation device 8 is connected to the setting device 4 for the transmitter 3. In this setting device 4, a further memory 9 is provided in which the minimum information necessary for a first link setup, for setting frequency and access methods of the memory 3, are stored. The setting device 4 is also connected to a data source 10, through the use of which the data to be transmitted by the user are fed to the transmitter and through the use of which the user also starts the automatic link setup.

If the user wishes to set up a link to a remote or opposite station of the same kind through the use of his or her station, he or she only presses a link setup key 11, and a fully automatic link setup then runs. The search receiver 5 searches all of the frequency bands provided in the respective zone, and it determines the instantaneous frequency assignment and the selection as to which of the searched frequency bands with which access method that is respectively permitted therein, is most suitable for a link setup, i.e. is least disrupted by other transmitters and is most favorable for it for shortwave links, for example also at the respective time of day, is then made in the evaluation device 8.

When this selection has been made, the setting device 4 of the transmitter 3 is correspondingly automatically activated through the use of the evaluation device 8, and the selected frequency band is then set, as well as the access method which is permitted there, and the setting device 4 receives this preliminary information for a first link setup from its memory 9. The transmitter 3 then transmits its call to the opposite station which likewise searches all of the frequency bands with its search receiver, continuously or at predetermined time intervals. Depending on the call detection method being used, which method may be structured in any desired known manner, a call is then detected, for example on a selected address channel or a specific organization channel of the frequency band selected by the call station. The data receiver is then correspondingly set in an automatic manner through the use of the evaluation device 8 and the link is thus set up. It is possible for the link then to be improved by a continued dialogue relating to frequency band and/or access method.

The transmitter 3 is set to the requested transmit frequency with the setting device 4, either for the very first call transmission or, for example, not until after the provisional link setup with the setting of minimum parameters. The modulator of the transmitter is also set to the respectively selected access method. In addition, the power of the transmitter is appropriately set depending on the frequency band, likewise the degree of modulation as well as the data rate at which the data to be transmitted are to be transmitted. In addition, a setting is made to determine whether half duplex (HDX) or full duplex (FDX) is to be carried out. If a specific reply channel is provided for the link setup, this is also determined through the use of the setting device 4. A recommendation relating to the respective protocol to be used for the transmission of data, error correction methods and the like can also be set through the use of the setting device during the transmission of data. This information is, for example, likewise stored in the memory 9 of the setting device 4.

I claim:

1. In a system for automatically setting up a radio link for transmitting data between at least two transmitter/receiver stations to be operated as call and opposite stations, the improvement comprising:

a) a memory of each station for storing data of frequency bands and of a plurality of access methods to be respectively applied in the bands and provided for radio links in a respective zone of the stations requesting the radio link;

b) a search receiver of each station searching all of the provided frequency bands continuously or at predetermined time intervals for a certain time, and analyzing and evaluating an instantaneous frequency allocation of the frequency bands provided by other transmitters;

c) an evaluation device connected to said memory and to said search receiver, said evaluation device taking the stored frequency band data into account for determining which of the searched frequency bands with which access method permitted therein is most suitable for a radio link set up;

d) a transmitter connected to said evaluation device, said transmitter of a call station requesting the link then activated in the selected frequency band by said evaluation device, and broadcasting an address of an opposite station; and e) a data receiver;

f) upon said search receiver of the opposite station receiving an address transmitted from said call station transmitter, the opposite station switching said data receiver thereof to reception in the frequency band with the access method permitted therein, for then carrying out a transmission of data between the call station and the opposite station.

2. The system according to claim 1, wherein said search receiver determines an amplitude distribution of the provided frequency bands in each case.

3. The system according to claim 1, including an additional analyzer associated with said search receiver for determining the access method used in a frequency band to be searched.

4. The system according to claim 1, wherein the broadcasting of the address of the opposite station is carried out by the call station in the selected frequency band in accordance with the access method preferred therein, and said search receiver of the opposite station searches in the frequency bands, in each case with the access methods preferred therein.

5. A method for automatically setting up a radio link for transmitting data between at least two transmitter/receiver stations to be operated as call and opposite stations, which comprises:

a) storing in a memory of each station data of frequency bands and of a plurality of access methods to be respectively applied in the bands and provided for radio links in a respective zone of the stations requesting the radio link;

b) searching all of the provided frequency bands continuously or at predetermined time intervals for a certain time with a search receiver of each station, and analyzing and evaluating an instantaneous frequency allocation of the frequency bands provided by other transmitters;

c) determining in an evaluation device which of the searched frequency bands with which access method permitted therein is most suitable for a radio link set up, while taking the stored frequency band data into account;

d) then activating a transmitter of the call station requesting the link in the selected frequency band with the evaluation device, and broadcasting the address of the opposite station; and e) switching a data receiver of the opposite station to reception in this frequency band with the access method permitted therein if a search receiver of the opposite station receives an address transmitted from the call station transmitter, and then carrying out a transmission of data between the call station and the opposite station.

6. The method according to claim 5, which comprises determining an amplitude distribution of the provided frequency hands in each case with the search receiver.

7. The method according to claim 5, which comprises determining the access method used in a frequency band to be searched with in additional analyzer associated with the search receiver.

8. The method according to claim 5, which comprises carrying out the broadcasting of the address of the opposite station by the call station in the selected frequency band in accordance with the access method preferred therein, and searching in the frequency bands with the search receiver of the opposite station, in each case with the access methods preferred therein.

* * * * *